Jan. 30, 1962

H. V. KINDSETH 3,018,512

SEALING APPARATUS

Filed Oct. 15, 1956

INVENTOR.
HAROLD V. KINDSETH
BY
ATTORNEYS

INVENTOR.
HAROLD V. KINDSETH

ATTORNEYS

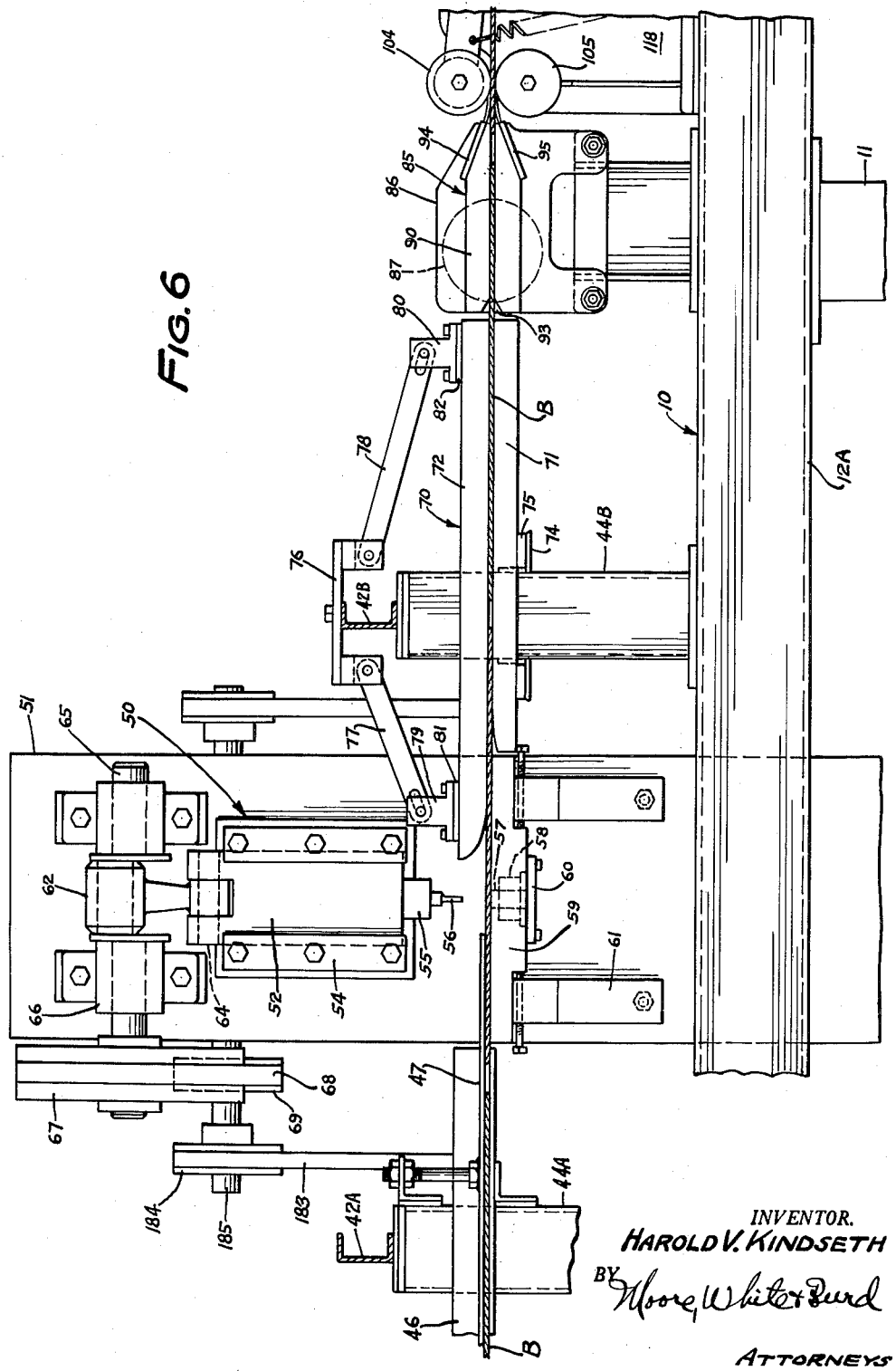

Jan. 30, 1962 — H. V. KINDSETH — 3,018,512
SEALING APPARATUS
Filed Oct. 15, 1956 — 11 Sheets-Sheet 6
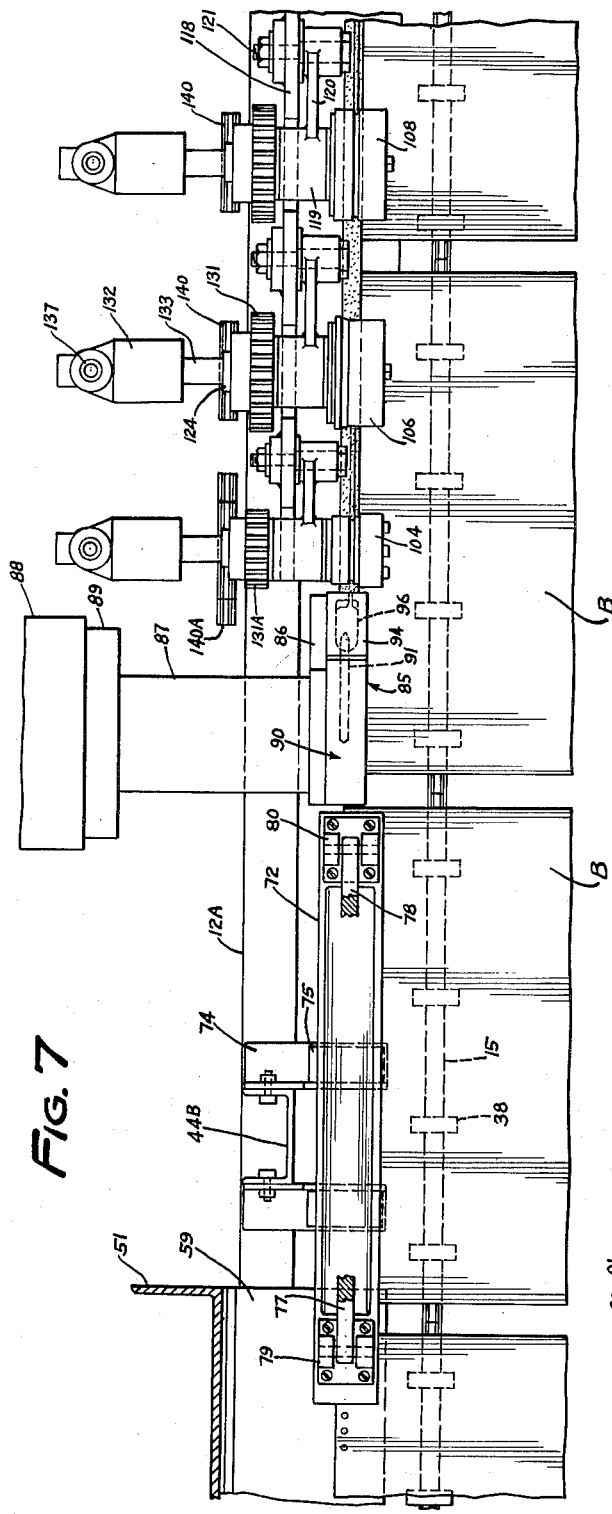
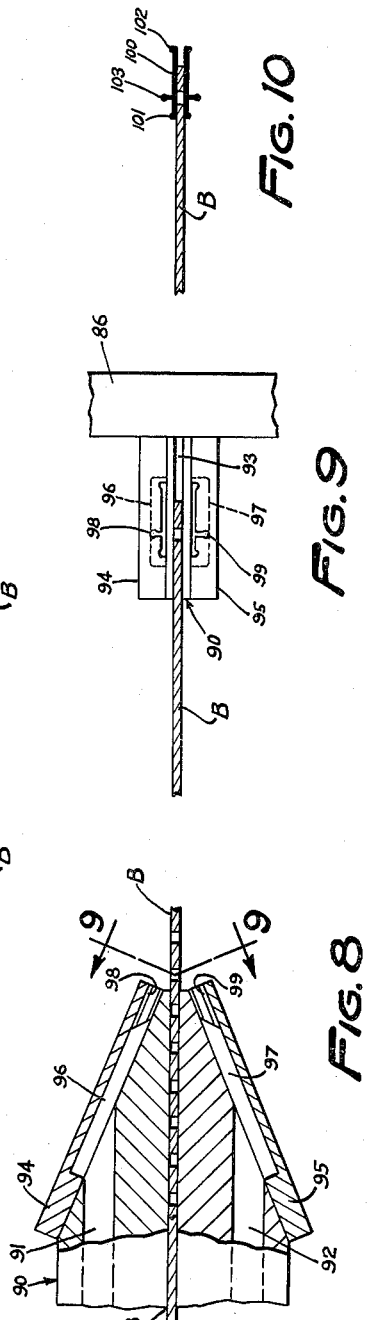
INVENTOR.
HAROLD V. KINDSETH
BY
ATTORNEYS Jan. 30, 1962 H. V. KINDSETH 3,018,512
SEALING APPARATUS
Filed Oct. 15, 1956 11 Sheets-Sheet 7
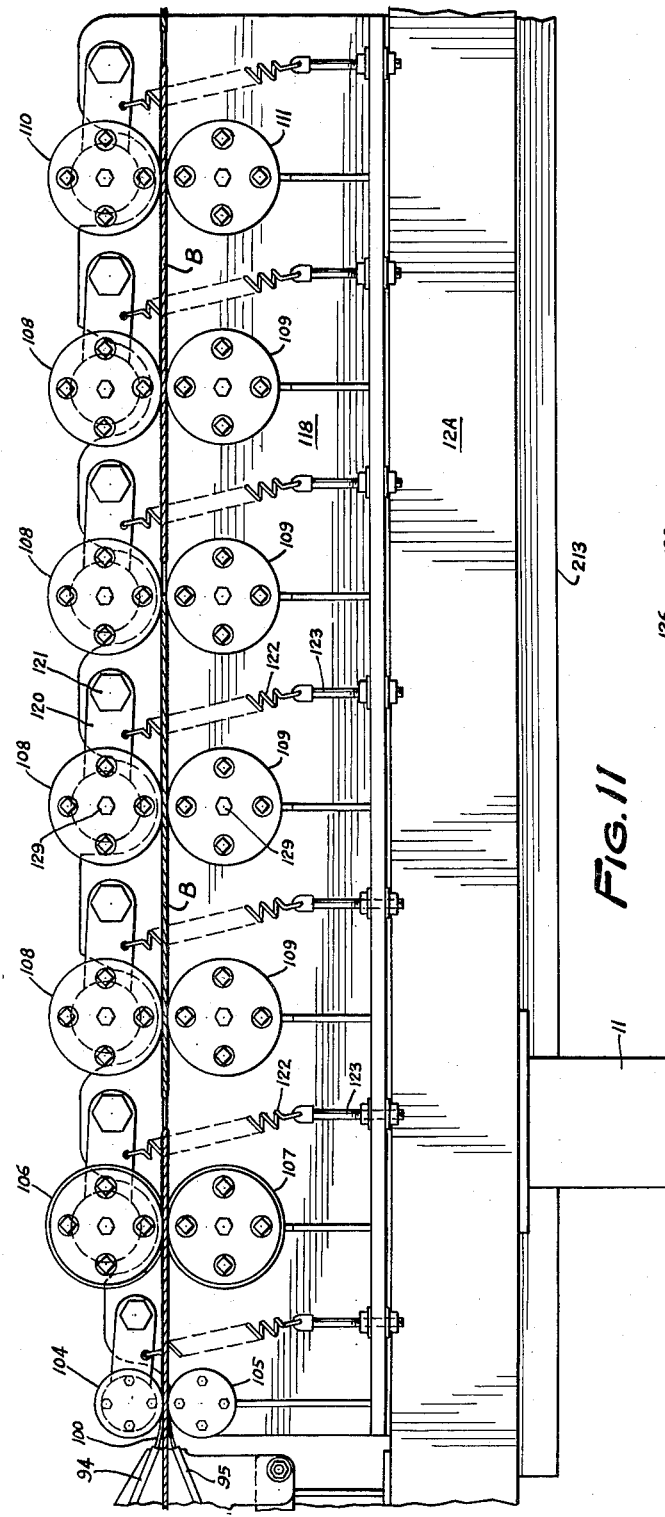
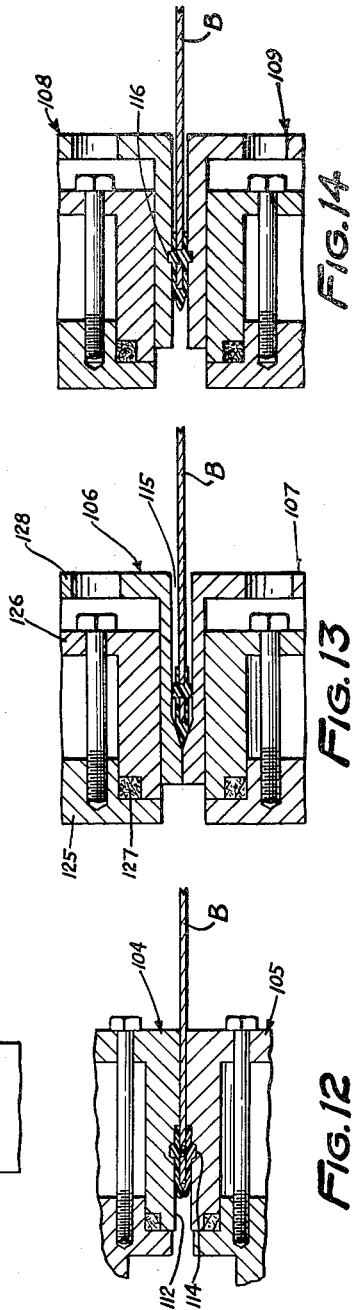
INVENTOR.
HAROLD V. KINDSETH
BY
Moore, White & Burd
ATTORNEYS Jan. 30, 1962     H. V. KINDSETH     3,018,512
SEALING APPARATUS Filed Oct. 15, 1956     11 Sheets-Sheet 8

INVENTOR.
HAROLD V. KINDSETH
BY
Moore, White & Beard
ATTORNEYS

Jan. 30, 1962  H. V. KINDSETH  3,018,512
SEALING APPARATUS
Filed Oct. 15, 1956  11 Sheets-Sheet 9

INVENTOR.
HAROLD V. KINDSETH
BY Moore, White & Burd
ATTORNEYS

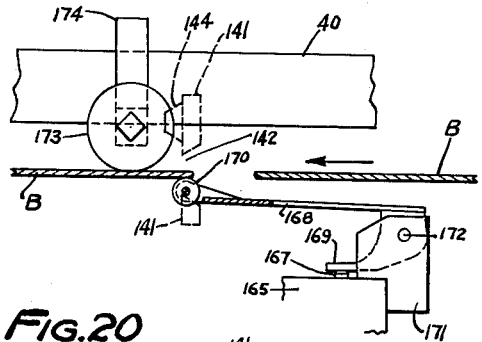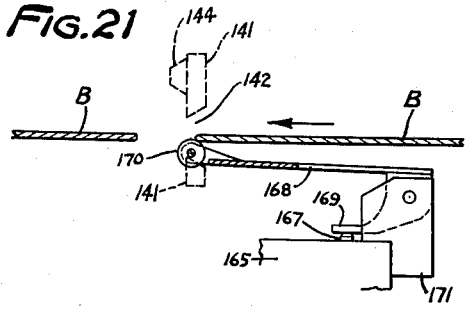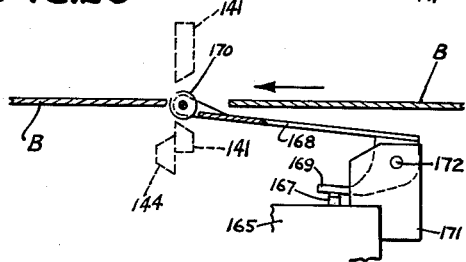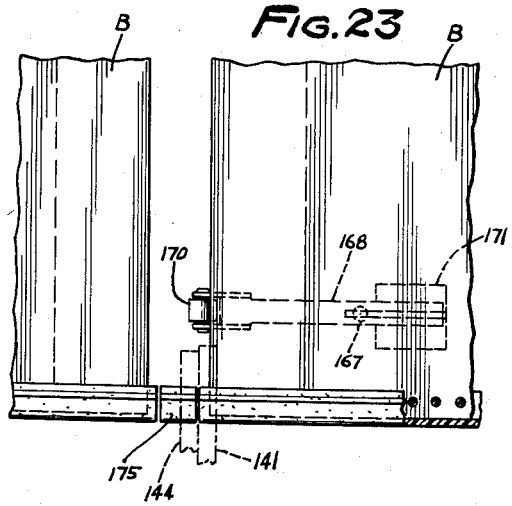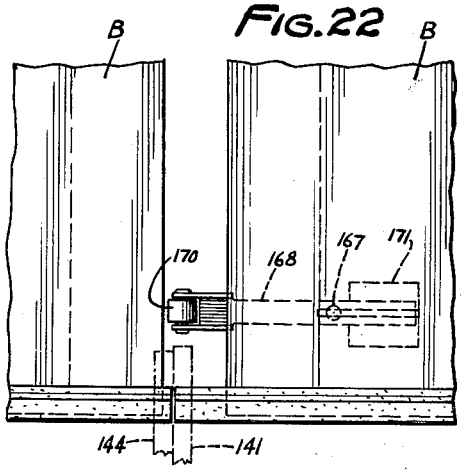

Jan. 30, 1962 H. V. KINDSETH 3,018,512
SEALING APPARATUS
Filed Oct. 15, 1956 11 Sheets-Sheet 11
FIG. 25
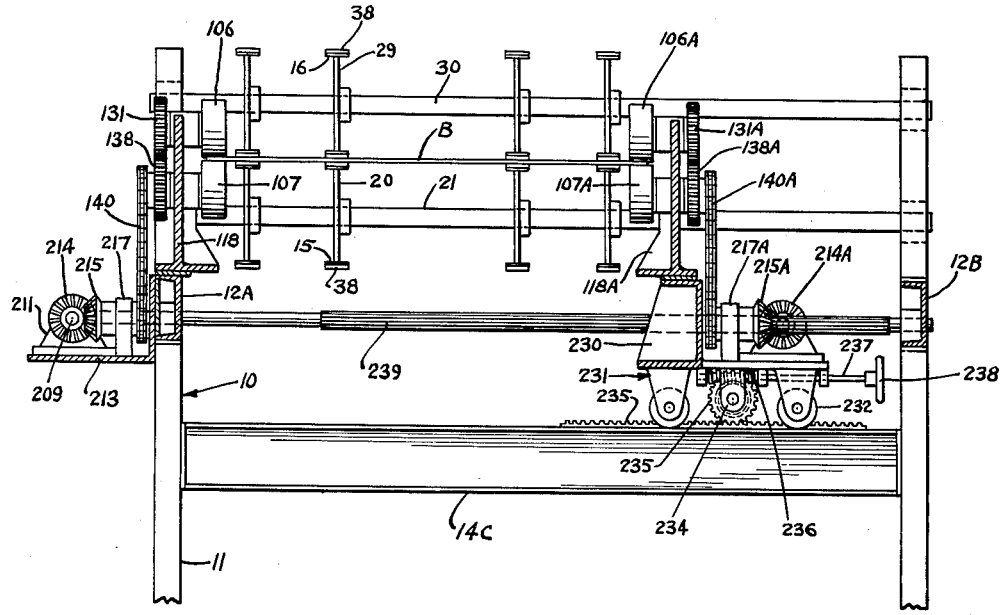
FIG. 9A
FIG. 10A
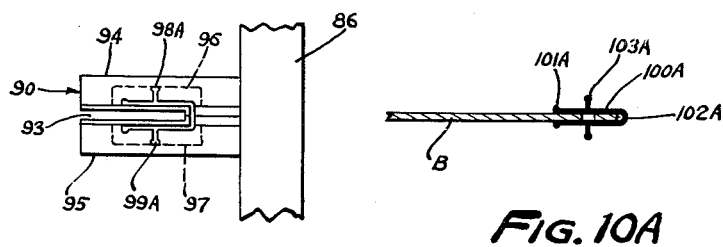
INVENTOR.
HAROLD V. KINDSETH
BY Moore, White & Burd
ATTORNEYS

United States Patent Office 3,018,512
Patented Jan. 30, 1962

3,018,512
SEALING APPARATUS
Harold V. Kindseth, Minneapolis, Minn., assignor to Bemis Bro. Bag Company, Minneapolis, Minn., a corporation of Missouri
Filed Oct. 15, 1956, Ser. No. 615,815
11 Claims. (Cl. 18—4)

This invention relates to apparatus for joining porous, foraminous, relatively open woven or knitted, or perforated sheet material together by means of thermoplastic material bonded through the sheets. More particularly this invention relates to bag closure apparatus for closing the ends of tubular bodies with thermoplastic resinous sealing elements bonded through perforations or other openings in the ends of the tubular bag blanks. In the preferred form of the invention the sealing element is in the form of a U-shaped ribbon.

This application is a continuation-in-part of my copending application Serial No. 444,828, now Patent Number 2,899,347, filed July 21, 1954, for Bag Closure and directed to bag closure per se and the method of making it.

The principal object of this invention is to provide an apparatus for sealing sheet material by extruding thermoplastic resinous sealing material along both sides of the porous, perforated or foraminous edges of sheet material and forcing the resinous material through the pores, perforations, openings or foramina to bond to itself and seal the sheet material together.

A further and more particular object of this invention is to provide an apparatus for forming an improved end closure for tubular bags by perforating the ends of the bag blanks, extruding thermoplastic resinous sealing material on both sides of the bag ends and forcing the resinous material through the perforations to bond with itself to form a secure end on the bags.

Another object of this invention is to provide a machine having conveying means for transporting a plurality of bag blanks in sequence through the machine, punch means for providing spaced perforations in either or both ends of the bag blanks, extrusion means for applying resinous sealing material along the opposite sides of the perforated ends of the bag blanks and roller means for pressing the resinous material to force it through the perforations and to cool it to produce a strong tight closure.

Other objects of the invention will become apparent as the description proceeds.

To the accomplishment of the foregoing and related ends, this invention then comprises the features hereinafter fully described and particularly pointed out in the claims, the following description setting forth in detail certain illustrative embodiments of the invention, these being indicative, however, of but a few of the various ways in which the principles of the invention may be employed.

The invention is illustrated by the drawings. For purposes of illustration an exemplary practical and useful form of the invention is shown, a machine for making closures in bag blanks. In order to avoid encumbering the disclosure with needless duplication of details the exemplary form of the invention is shown principally with reference to a machine for closing one end of a bag blank. It will be readily apparent that both ends of a bag blank may be closed simultaneously by providing corresponding functional elements on the opposite side of the machine and such a double machine is contemplated by this invention. As shown in FIGURE 25, the elements on one side of the machine are adjustably mounted for adaptation to bag blanks of varying lengths.

It is to be understood that the machine as illustrated is useful without change, for the sealing of sheet material other than bag blanks. For example, the apparatus may be used to seal running lengths of cloth, paper, metal foils, laminations, non-thermoplastic resinous films or the like, or cut sheets of the same materials. Attention is directed to the drawings in which the same numerals refer to corresponding parts and in which:

FIGURES 1 and 2 taken together show a side elevation of one form of the bag closure machine;

FIGURE 6 is a partial side elevation of the punching, preheating and resin applying stations of the bag closure machine;

FIGURE 7 is a partial top plan view of the preheating, resin applying and initial cooling and squeezing stations;

FIGURE 8 is an enlarged vertical section through the extruding die of the bag closure apparatus;

FIGURE 9 is a front elevation of the die taken on the line 9—9 of FIGURE 8 and in the direction of the arrows; FIGURE 9A is a front elevation of a modified and preferred form of die for extruding a U-shaped ribbon of resinous material;

FIGURE 10 is a vertical section through a portion of a bag blank end showing the shape of the applied extruded resin produced by the die of FIGURE 9; FIGURE 10A is a vertical section through a portion of a bag blank end showing the shape of the applied extruded resin produced by the die of FIGURE 9A;

FIGURE 11 is a side elevation of the cooling and squeezing rolls of the bag closure machine;

FIGURES 12, 13 and 14 are fragmentary vertical sections through successive sets of cooling and squeezing rolls;

FIGURES 19, 20 and 21 show schematically the successive steps in severing the extruded resinous closure;

FIGURES 22 and 23 are top plan views of the mechanism of FIGURES 20 and 21, respectively, showing the severing sequence; and FIGURE 24 is a fragmentary enlarged vertical section through one end of a closed gusseted bag blank.

FIGURE 25 is an exemplary view through the cooling roll section of a bag closure machine adapted to seal both ends of a tubular bag blank and adjustable to accommodate blanks of varying lengths.

Figure 1:
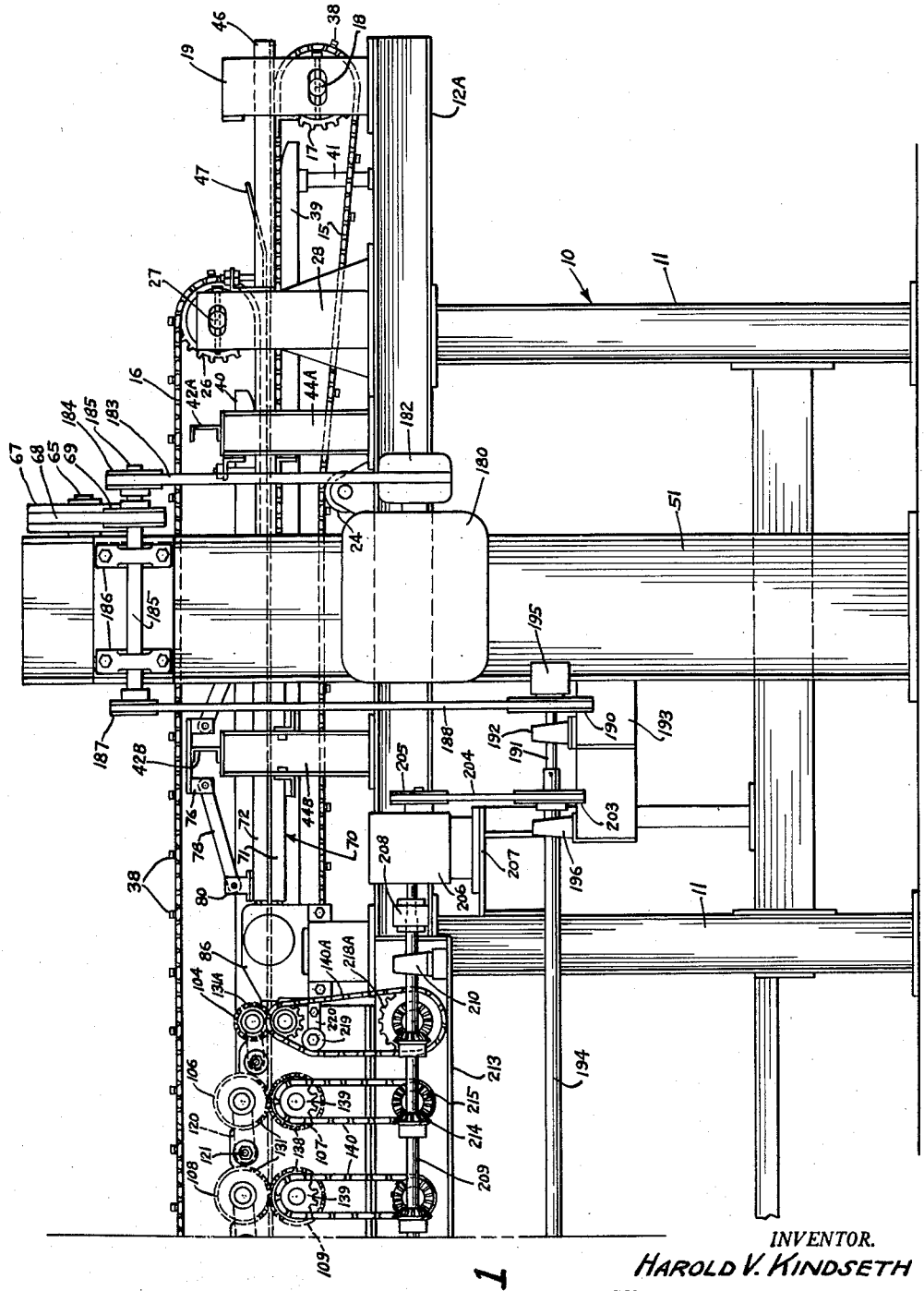
Figure 2:
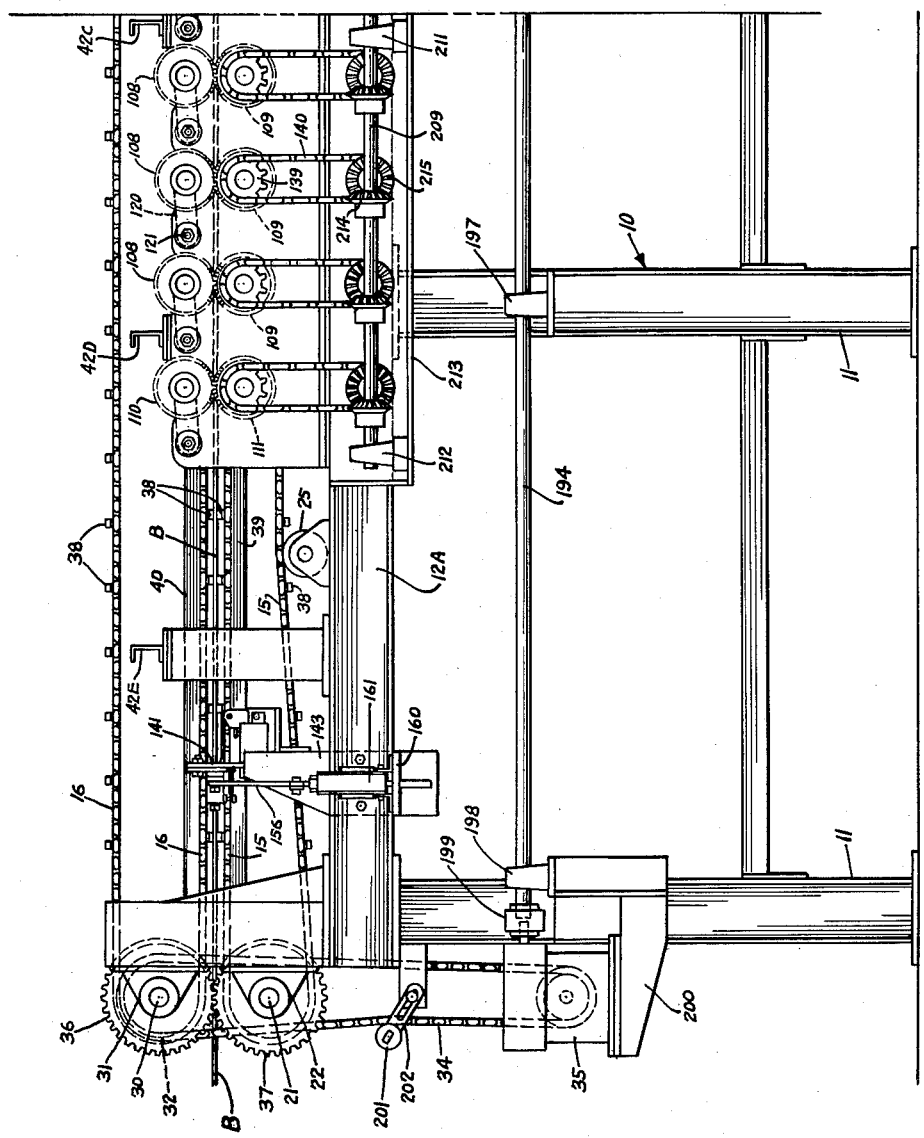
Figure 3:
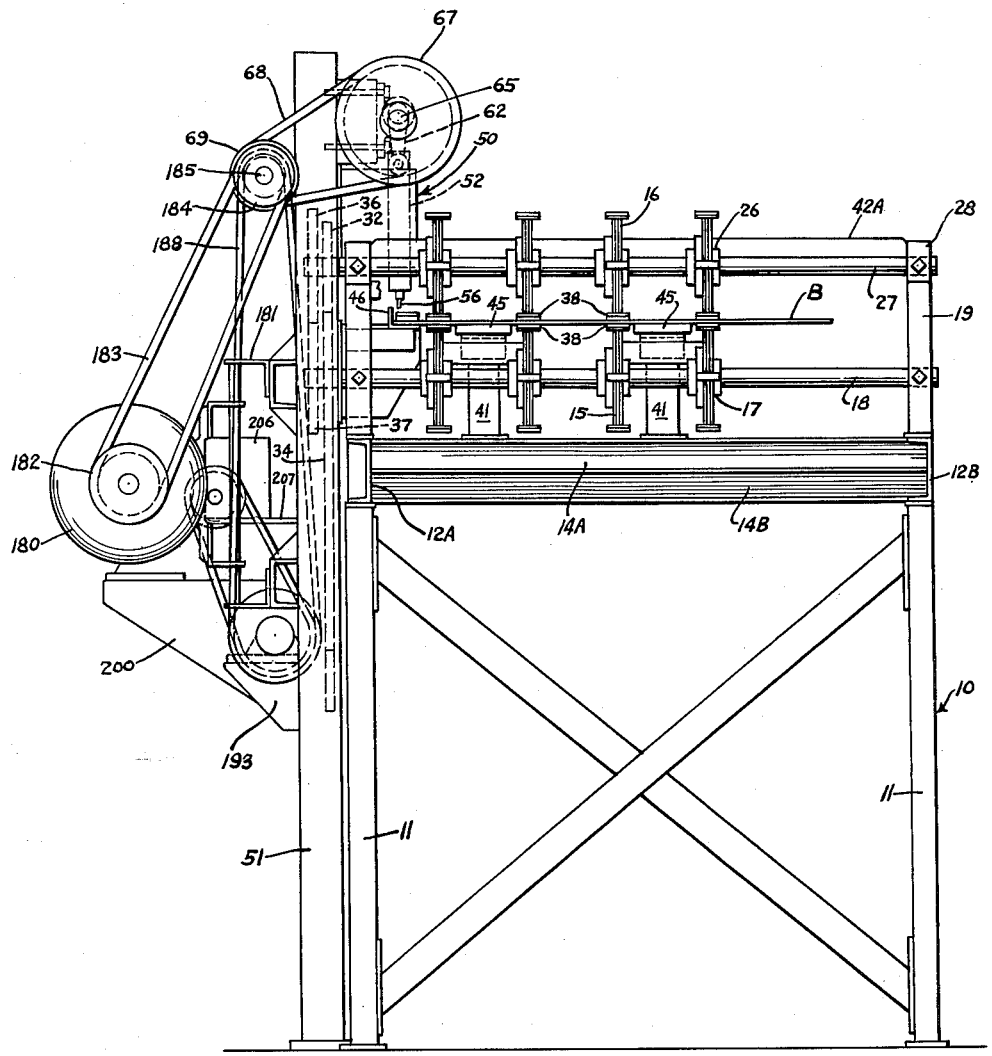
FIGURE 3 is an end elevation of the bag closure machine shown in FIGURES 1 and 2.
Figure 4:
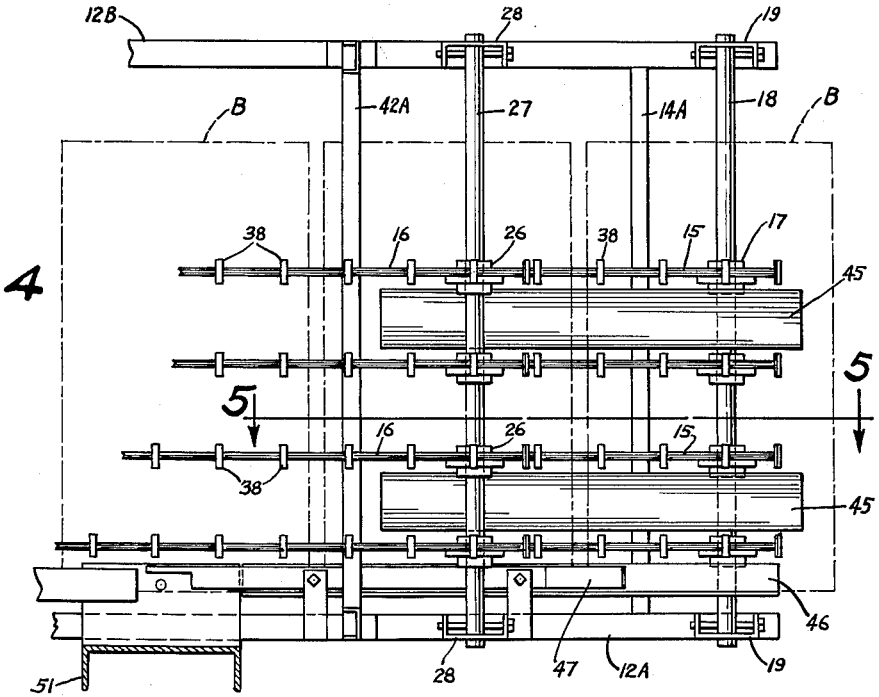
FIGURE 4 is a top plan view of the entry end of the bag closure apparatus.
Figure 5:
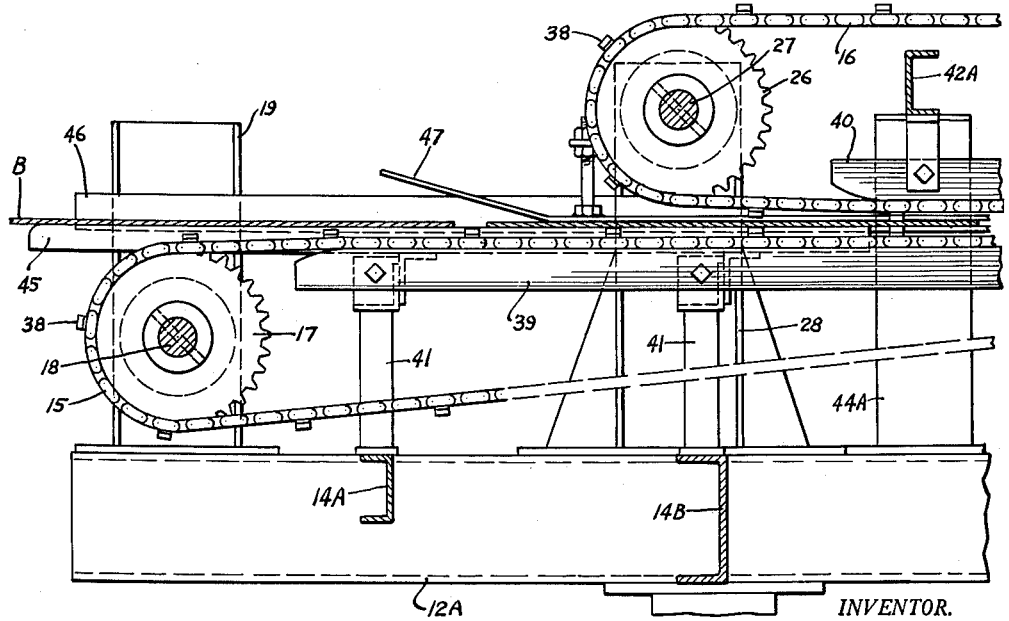
FIGURE 5 is a partial vertical section, somewhat enlarged, taken generally on the line 5—5 of FIGURE 4 and in the direction of the arrows.

Referring to the drawings, and particularly to FIGURES 1, 2 and 3, in FIGURES 1 and 2 taken together there is shown a side elevation of one form of the bag closure apparatus of this invention adapted to seal one end of a bag blank and in FIGURE 3 there is shown an end elevation of the inlet or feeder end of the machine. The direction of movement of a bag blank through the machine is from right to left in FIGURES 1 and 2.

The bag closure apparatus is supported off the floor by a generally rectangular frame 10 including a complement of spaced vertical legs 11, a pair of spaced horizontal parallel longitudinal beams 12A and 12B resting on the legs and a plurality of transverse horizontal members 14A, 14B etc. between the beams, the whole being braced and secured together into a rigid unitary supporting structure. Bag blanks B to be closed at one end are carried through the machine by a bag conveying system mounted on the top of frame 10.

BAG BLANK CONVEYOR

*(FIGURES 1 to 5)*

The conveying system includes a lower set of continuous roller chains 15 and an upper set of continuous roller chains 16 each mounted to run longitudinally of the machine. Lower chains 15 extend substantially the length of the machine and are supported at the inlet end upon idler sprockets 17 carried on a transverse horizontal shaft 18 adjustably mounted in vertical take-up brackets 19 on the tops of rails 12A and 12B. The opposite ends of the chain loops 15 are supported on sprockets 20 keyed to a shaft 21 journalled in bearings 22. Between the ends of the machine the lower flight of chains 15 is supported on idler rollers 24 and 25 each journalled in bearings on the top of side rails 12A and 12B.

Upper chains 16 extend for a somewhat shorter distance than do the lower chains to facilitate feeding of bag blanks. The upper chains are positioned directly above the lower chains and are supported at the inlet end of the machine upon idler sprockets 26 carried on a transverse horizontal shaft 27 adjustably mounted in vertical take-up brackets 28 on the tops of rails 12A and 12B. The opposite ends of chain loops 16 are supported on sprockets 29 keyed to a shaft 30 journalled in bearings 31. Shaft 30 is provided with a drive sprocket 32 driven by chain drive 34 from a standard worm reducer gear box 35 driven from a central power source in a manner explained hereinafter. Shaft 30 is also provided with a gear 36 whose teeth mesh with those of a companion gear 37 on shaft 21 to synchronously drive the sprockets carrying chains 15 and 16.

At spaced intervals along each of chains 15 and 16 there are provided resilient gripping pads 38 which come into approximate registry to grip the bag blanks B and firmly hold them while carrying them through the closure machine. The upper flights of lower chains 15 are guided and supported between the extremities of sprockets 17 and 20 by bottom chain rails 39 which extend substantially the entire distance between the sprockets. At the same time the lower flights of upper chains 16 are guided and urged downwardly toward chains 15 by top chain rails 40. In this manner a tight grip on the bag blanks is assured. The bottom chain rails 39 are supported by vertical members 41 which in turn are carried by transverse horizontal members 14A, 14B, etc. Top chain rails 40 are suspended from spaced transverse horizontal members 42A, 42B etc. supported by vertical frame extensions 44A, 44B etc. at intervals along the machine.

FEEDER

*(FIGURES 1, 4 and 5)*

To facilitate feeding of bag blanks there are provided a plurality of longitudinal horizontal feeder boards 45 supported by vertical members 41 and positioned between lower chains 15 at a level about at the top surfaces of gripper pads 38 as they pass over bottom chain rail 39. Since the chain rail 39 lifts the chains 15 and gripper pads slightly, the feeder boards are at a level somewhat above the top surfaces of the pads as the chains leave sprockets 17. A bag blank feed into the machine on the feeder boards is thus initially partially supported out of contact with the gripper pads permitting the innermost set of pads to initially contact one edge of the blank and move the blank forward for contact in sequence by succeeding sets of pads 38. To insure proper positioning of the bag blank in its passage through the closure machine there is provided a horizontal longitudinal guide 46 against which the end of the blank is urged. A longitudinal top guide 47 assists in directing the blanks between the sets of chains and gripper pads of the conveyor system.

The operations performed upon bag blanks fed through the machine as illustrated include in sequence: punching a plurality of perforations in one end of a bag blank, preheating the perforated bag end, extruding softened thermoplastic resinous sealing material along opposite sides of the perforated bag end, squeezing the resinous material through the perforations and around the bag end to form a closure and cooling to solidify the closure, and finally severing the resulting continuous resinous strip to separate the bags. In the form of the invention illustrated all of the operations are carried out along one side of the closure machine and the performing mechanisms are driven from a common power source.

PUNCH PRESS

*(FIGURES 1, 3 and 6)*

The first operative step performed after the bag blanks are fed into the closure machine against the guides and picked up by the conveyor system is the punching of a plurality of spaced perforations in a line across one end of the bag blank. This operation is performed by a punching unit best shown in FIGURE 6. The punch press indicated generally at 50 is supported on a vertical standard or channel 51 mounted along one side of machine frame 10 so that punch press 50 lies in the path of travel of bag blanks B as they are moved through the machine.

The punch press comprises generally a punch ram 52 supported for vertical reciprocatory movement in a punch ram slide 54 and carrying a punch retainer 55 and a punch 56 at its lower end. Punch 56 coacts with a die button 57 held in a die button retainer 58 in the surface of punch table 59. The die members are held in the press table by die retainer plate 60. Press table 59 is supported by braces 61 which are mounted on channel 51 at a level so that the bag blanks are delivered from guides 46 and 47 to the top surface of the table.

The upper end of punch ram 52 is cut out to receive one end of a connecting rod 62, pivotally mounted on a pin 64. The opposite end of connecting rod 62 is carried by a crank shaft 65 journalled in bearings 66 which are mounted on channel 51. A flywheel 67 is keyed to crank shaft 65 and connected by belt 68 to a driven pulley 69 so as to impart rotary motion to the crank shaft and rapid reciprocating movement to the punch ram and punch to punch out a line of perforations across the ends of the bag blanks carried through the machine.

The form of punch press shown and described is exemplary only. Any type of punch design may be adapted for use here, for example, a pneumatic punch. Similarly, a punch which produces more than one hole at a time may readily be substituted for that shown. Where the sheet material to be punched is perforated prior to being introduced to the sealing machine, or where the sheet material is porous, foraminous, or otherwise open along the sealing edges the punching unit may be dispensed with entirely.

PREHEATER

*(FIGURES 1, 6 and 7)*

As the perforated bag blanks are carried away from the punch press 50 the perforated ends are passed through a preheater unit indicated generally at 70 to render the end of the blank more receptive to the plastic sealing and closing material. The preheater comprises an elongated horizontal fixed lower heater element 71 disposed longitudinally along the frame of the machine in the path of the perforated end of the bag blanks and a somewhat longer elongated horizontal resiliently mounted upper heater element 72 disposed above the lower heater element. Both heating elements are suitably heated preferably electrically. The lower heater element is supported in a bracket 74 on vertical frame extension 44B and held spaced from the frame by insulating pads 75. The leading end of lower heater element 71 is adjacent to but slightly spaced apart from punch table 59 to receive the bag blanks as they leave the punch table and it is curved slightly to form a mouth with upper element 72 for facilitating entry of the blanks.

Upper heater element 72 is suspended from a bracket 76 supported by top chain rail support 42B. The upper ends of a pair of arms 77 and 78 are pivotally connected to bracket 76 and the lower ends of these arms are pivotally and slidably connected to brackets 79 and 80 respectively carried by upper heater element 72. Brackets 79 and 80 are insulated from the heater element by pads 81 and 82 of insulating material. Upper heater element 72 is thus resiliently mounted being free to adjust vertically to blanks of varying thicknesses. The leading edge of heater element 72 extends over punch table 59 and is curved to form a mouth with the top of the punch table to facilitate entry of the bag blanks between the opposed surfaces of the preheater.

The particular form of preheater illustrated and described is illustrative of the type of heating means which may be employed. Where the sheet material being sealed is paper the resin adheres to the heated sheets better because the hot plastic is enabled to run into and impregnate the sheets. Obviously other conventional heating means may be used to accomplish the same result, among which may be mentioned radiant heating from lamps or other means, gas flames, heated continuous metal belts, heated rolls, etc. Where the sheet material is of a relatively non-porous or impermeable nature or otherwise insensitive to heat, preheating may afford no advantage and may therefore be dispensed with.

EXTRUSION MEANS

*(FIGURES 1 and 6 to 9)*

The bag closure machine is provided with an extrusion die head assembly indicated generally at 85 adapted for use in conjunction with the extrusion head of any of a number of commercially available extruders for thermoplastic resinous materials. The extruder per se forms no part of this invention.

The die head assembly 85 is supported by a die head plate 86 mounted on the machine frame 10 and adapted to receive the end of die extension 87 which is fitted to the extrusion head 88 of a standard extruder through an adapter 89. The die head assembly includes a die head 90 (FIGURE 8) provided with upper and lower longitudinal channels 91 and 92, both of which are in communication with the resin channel of die extension 87 and the extruder head 88. The die head is also provided with a central longitudinal slot 93 for receiving the perforated ends of bag blanks for passage through the die head. The leading edge of slot 93 is flared slightly to facilitate entry of the bag blank as it is carried from between the heater elements of preheater 70.

The face of die head 90 is tapered toward slot 93 in the direction of movement of the blanks and is provided with upper and lower die cover plates 94 and 95. Each of the plates 94 and 95 is provided with a longitudinal channel 96 and 97, respectively, in their inner surfaces, said channels being in communication with die head channels 91 and 92, respectively. Channels 96 and 97 terminate in openings 98 and 99, respectively, which serve as dies for the extruded plastic material. Openings 98 and 99 (FIGURE 9) are of such a shape as to form plastic tapes which have a cross sectional configuration (FIGURE 10) corresponding to an elongated bar 100 having bulbous ends 101 and 102 and having a bulbous projection 103 intermediate of the ends. The projection 103 is so positioned as to lie over the perforations punched in the end of the bag blanks to provide a sufficiency of resinous material to form the bonded closure connections through the perforations. The bulbous ends 102 provide an excess of resinous material for enclosing and sealing the end edges of the bag blanks. As the bag blanks pass through slot 93 and between the openings 98 and 99 a semi-solid tape of plastic material is applied to the opposite sides of one end of the bag blanks as shown in FIGURE 10.

In FIGURE 9A there is shown a die head for producing a preferred form of sealing extrusion. This form of die head is constructed similarly to that already described with reference to FIGURES 8 and 9, the difference being in the form of the openings which serve as dies for the extruded plastic material. Openings 98A and 99A are of such a shape as to form a U-shaped plastic ribbon having a cross sectional configuration as shown in FIGURE 10A. The ribbon 100A is U-shaped and encloses one edge of the bag blank B. The ribbon has bulbous ends 101A along its open edges on the opposite sides of the blank. The fold 102A at the closed side of the ribbon encloses the edge extremity of the blank. A bulbous projection 103A is provided to overlie the perforations on both sides of the blank to provide a sufficiency of resinous material to form the bonded closure through the perforations, allowing for some shrinkage of the plastic material. The inner edges of openings 98A and 99A of the die head are open and adjoining and in communication with channels 96 and 97 to form a continuous one-piece U-shaped extrusion.

The bag closure apparatus of this invention is adapted to be used with any of a wide variety of thermoplastic sealing materials, the choice of a particular resin being dictated by such factors as required strength, required flexibility, the size of the bag blank, the nature of the goods to be contained in the bag, etc. Polyethylene resins are well adapted for this use.

COOLING AND SQUEEZING ROLLS

*(FIGURES 1, 2, 7 and 11 to 16)*

Following extrusion of the tapes of semi-solid resinous material on the opposite sides of the perforated end of the bag blank the end of the blank is immediately carried between a series of cooled squeeze rolls to force the softened resinous material through the perforations and around the end edge of the blank to bond the tapes of resinous material together and form a tight seal. The first set of rolls 104—105 (FIGURE 12) is provided with peripheral circumferential channels 112 for receiving and shaping the resinous tapes while the remaining peripheral surfaces of the rolls squeeze the bag blank itself. This serves to confine the sealing strip to the end of the blank and provides the inner edge of the plastic closure with a neat clean-cut appearance. At the same time the plastic material is forced together around the end of the blank. Channels 112 are provided with narrower deeper channels 114 overlying the projection 103 on the plastic tape to conserve sufficient available plastic material to extend through the perforations to accomplish the desired closing bond.

The next set of rolls, pinch rolls 106—107 (FIGURE 13), is provided with peripheral circumferential channels 115 on the opposite sides of the rolls so that the peripheral surfaces of the rolls rotate in contact and the channel surfaces acting upon the plastic closure force the resinous material into the perforations and seal the plastic material over the end edge of the bag blank.

The next several sets of rolls 108—109 (FIGURE 14) are smooth rolls except for shallow peripheral circumferential channels 116 overlying the perforations in the blank and the projection 103 on the plastic tape. The final set of rolls 110—111 (FIGURE 16) is knurled so as to impart greater flexibility to the finished closure. These rolls are likewise provided with shallow circumferential channels 116A overlying the perforations in the bag blanks.

Any type of roll may be used which causes variation in the thickness of the plastic closure to lower its bending moment in the longitudinal direction.

Each of the lower cooling rolls 105, 107, 109 and 111 is fixedly journalled for rotation in a sleeve 117 in a cooling roll bracket 118 which is mounted on the side rail 12A of the frame 10. The upper surfaces of the rolls are aligned longitudinally in the path of travel of the bag blanks. Each of the upper rolls 104, 106, 108 and 110 is resiliently mounted. Each of these rolls is journalled for rotation in a sleeve 119 at one end of a cooling roll arm 120. The opposite end of arm 120 is pivotally connected at 121 to the cooling roll bracket 118.

A coil spring 122 between arm 120 and a spring bolt 123 secured to bracket 118 constantly urges the resiliently mounted roll against the fixed roll to apply the requisite squeezing pressure. At the same time no difficulty is encountered when closing bag blanks of different thickness, or as in the case of a gusseted bag when a single blank is of varying thickness. The top edge of bracket 118 is provided with indentations 124 for accommodating the bearing sleeves 119 of arms 120 and to provide access for drive means for the upper rolls and for the introduction of cooling fluid.

Figures 15, 16:
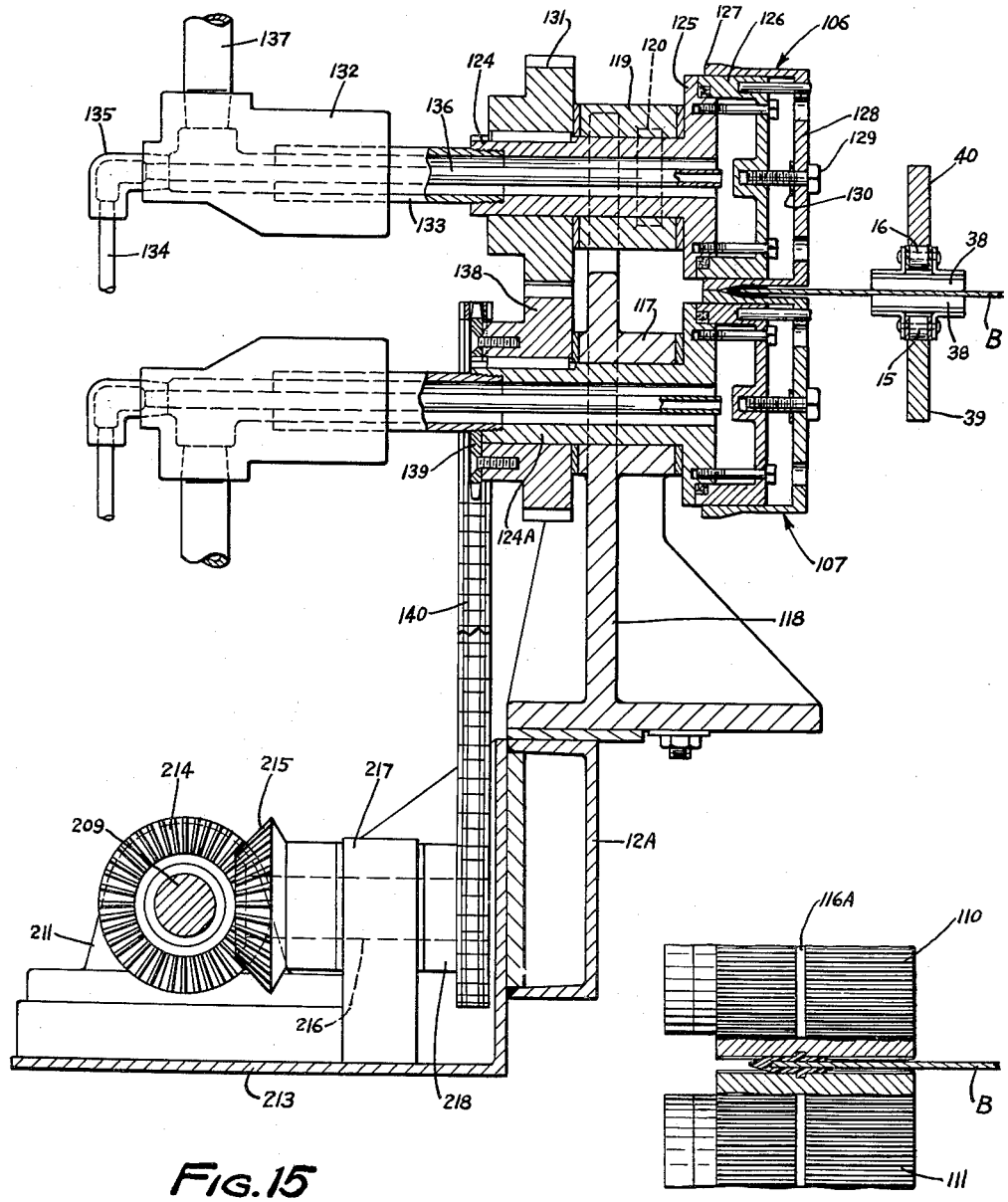
FIGURE 15 is an enlarged vertical section showing the details of construction of the cooling and drive means for the squeeze rolls.
FIGURE 16 is a fragmentary, partially sectional view of terminal knurling rolls.
Figure 17:
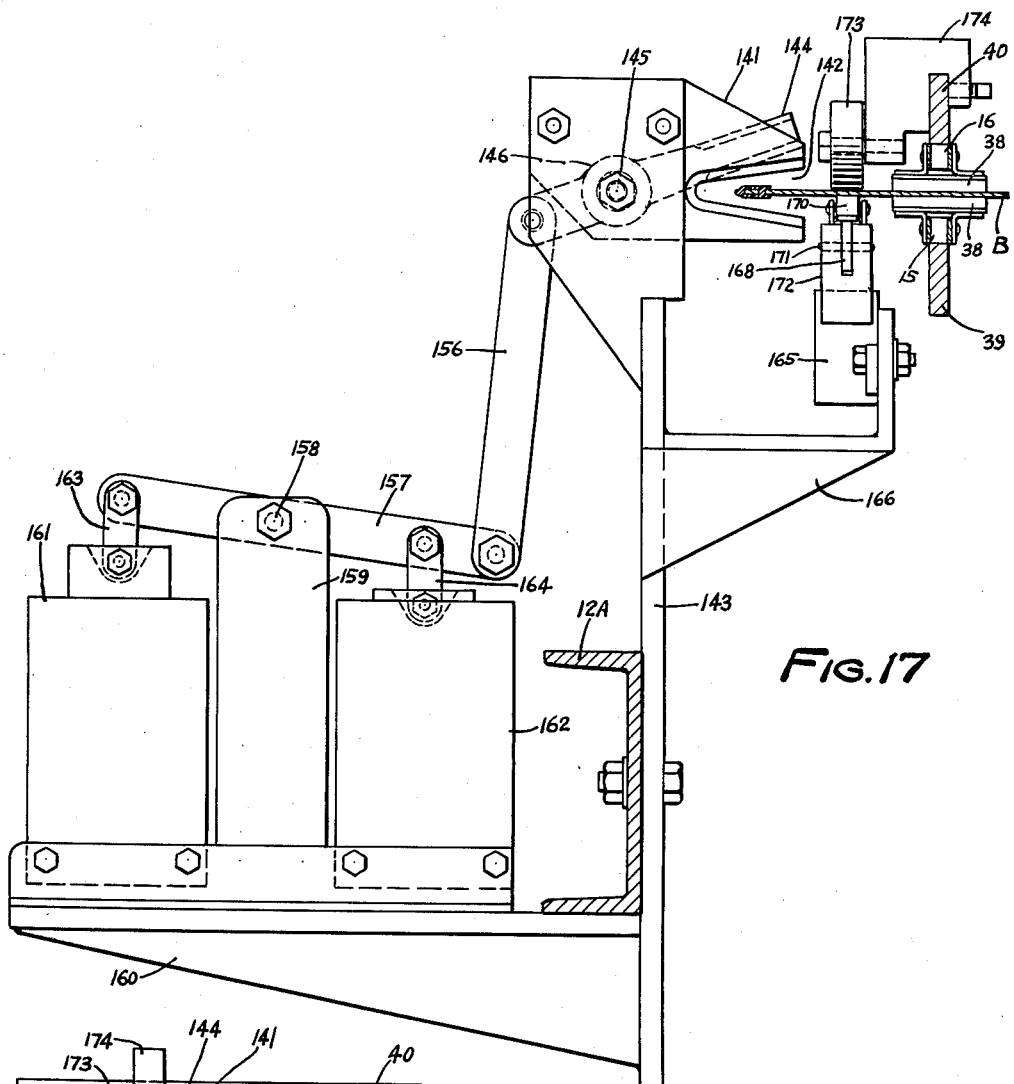
FIGURE 17 is an end elevation, partly in section, showing severing mechanism for freeing closed bag blanks as they pass through the closure machine.
Figure 18:
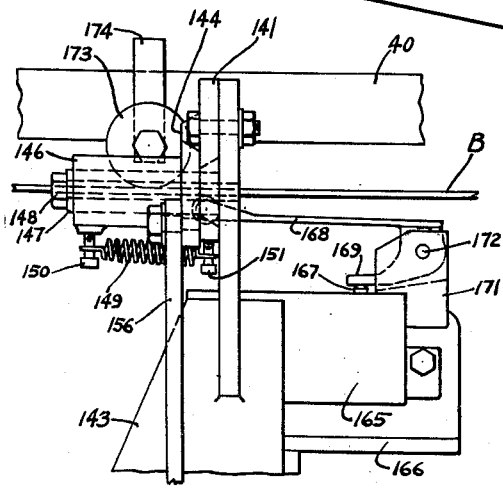
FIGURE 18 is a side elevation of the tripping mechanism for actuating the severing device.

The cooling and drive mechanism for the rolls is best shown in FIGURE 15 with particular reference to pinch rolls 106—107. It will be understood, however, that substantially identical cooling and driving means are used in connection with each of the other sets of rolls. Roll 106 comprises a hollow shaft 124 journalled in bearing sleeve 119 and having a flanged end 125. The flanged end 125 of shaft 124 is provided with a shoulder against which the pinch roll body 126 is fitted. Suitable packing 127 is provided in the joint to make a fluid tight seal. A pinch roll sleeve 128 having the configuration described for rolls 106—107 is fitted with a sliding fit over the roll body 126. The roll assembly is secured together with bolts. Pinch roll sleeve 128 is adjustably mounted by virtue of bolt 129 secured to the sleeve by collar 130 and threaded into a central threaded aperture in the roll body 126.

A drive pinion 131 is keyed to the opposite end of hollow shaft 124. A water jacket 132 is connected by a short length of pipe 133 to hollow shaft 124. The pipe 133 is rotatably mounted with a liquid seal in water jacket 132. Water from a cold water pipe 134 is introduced through an elbow 135 to an elongated cold water tube 136 which extends through the water jacket and connecting pipe and hollow shaft to the hollow pinch roll 106. The cooling water return is by way of hollow shaft 124 and connecting pipe 133 to the water jacket 132 and an outlet pipe 137 around the outside of tube 136.

The construction of pinch roll 107 and the cooling system for that roll are the same as that described for roll 106. The hollow shaft 124A of roll 107, of course, is journalled in fixed bearing sleeve 117 in bracket 118. Shaft 124A is provided with a drive pinion 138 keyed to the shaft and intermeshing with the teeth of pinion 131. A drive sprocket 139 is keyed to pinion 138 and is driven by a chain drive 140 as described in detail hereinafter. The other rolls are cooled and driven in substantially the same manner as described for pinch rolls 106 and 107 and their construction is substantially the same, except that only the pinch rolls are provided with the adjustable sleeves 128. The construction of rolls 108—109 and 110—111 is essentially the same as that described for rolls 106—107 with the exception of the different circumferential surfaces.

Although cooling rolls are a practical and preferred means for urging the plastic sealing material into the perforations while cooling it, they are by no means the only devices for accomplishing this result. For example, cooled continuous metal bands on pulleys can be used. For bags, cooled clamping members adapted to engage the entire bag end may be used.

TAPE SEVERING UNIT

(FIGURES 2 and 17 to 23)

As the bag blanks pass through the extruder die head and the cooling rolls successive blanks are attached together by virtue of the continuous plastic strip enclosing the bag blank ends. This necessitates the provision of means for severing the plastic strip and separating the bag blanks. Because the blanks are fed in slightly spaced relation it is most generally necessary to sever the plastic strip twice, once along each side edge of the bag and means for accomplishing this end are shown and described.

Automatic severing means are provided mounted on the frame in the path of the sealed bag blanks as they are carried by the conveyor system away from the cooling rolls. The severing means comprises a clipper plate 141 having an open jaw 142 through which the sealed blank ends must pass. The clipper plate 141 is supported on a bracket 143 attached to side rail 12A of frame 10. A double edge clipper blade 144 is pivotally mounted at 145 on the clipper plate to cut the plastic sealing tape in cooperation with the sharpened edges of jaw 142.

The pivotal mounting for blade 144 includes a sleeve 146 secured to the blade, a bushing 147 within the sleeve and a machine screw 148 passing through the bushing and sleeve and threaded into clipper plate 141. The clipper blade 144 is resiliently urged against the clipper plate 141 by means of a coil spring 149 between an Allen screw 150 in the lower edge of sleeve 146 and another screw 151 below the jaw 142 of the clipper plate 141. The end of the clipper blade 144 opposite to the cutting edges is connected by a pivot arm link 156 to a solenoid operated pivot arm 157. Arm 157 is pivotally supported at 158 by a vertical pivot standard 159 which is carried on a base 160 mounted on bracket 143 and extending outwardly from the side rail 12A.

Base 160 also carries two solenoids 161 and 162 aligned with standard 159 under pivot arm 157. The plunger of solenoid 161 is pivotally connected by a solenoid link 163 to the outer end of the pivot arm 157 and the plunger of solenoid 162 is pivotally connected by a solenoid link 164 to pivot arm 157 on the opposite side of pivot mount 158. Thus, when solenoid 162 is actuated by flow of current, as explained hereafter, the plunger is drawn downward exerting a pull on pivot link 164 and arm 157 and through it on link 156 which pushes clipper blade 144 upward. By this action, on the upward stroke, the upper edge of blade 144 and jaw 142 cooperate to sever the plastic tape in the jaw at the time. When solenoid 161 is actuated by flow of current the plunger exerts a pull on link 163 and pivot arm 157, pushing pivot arm link 156 upward and pulling clipper blade 144 downward. On this downward stroke the lower edge of blade 144 in cooperation with the lower edge of jaw 142 severs the plastic tape.

The solenoids 161 and 162 are actuated through a two-way micro switch 165 by the passage of the blanks through this end of the machine, as follows: Micro switch 165 is supported on a base 166 mounted on the inner side of bracket 143 so that the switch lies under the bag blanks as they move through the machine. The push button 167 of switch 165 is normally urged upwardly by spring pressure. With the switch button in this position solenoid 161 is actuated and clipper blade 144 is in its lower position. With the switch button depressed against the spring pressure solenoid 162 is actuated and clipper blade 144 is in its upper position. Each change in position of the clipper blade causes severing of the plastic bag closing tape.

The position of switch button 167 is controlled by a bent switch arm 168 having a button depressing foot 169 at one end and a roller 170 at the other end in the path of travel of the bag blanks. The elbow of arm 168 is pivotally mounted at 171 in a block 172 supported by micro switch 165. A hold down roll 173 is mounted in a bracket 174 which in turn is supported by top chain rail 40. Roll 173 serves to stabilize the end of the bag blank against the action of the movable clipper blade. Roll 170 on micro switch arm 168 facilitates the smooth passage of the bag blanks over the end of the arm.

In its normal position roll 170 is urged upwardly into the direct path of the moving bag blanks above the normal surface of the blanks. Because of its resilient mounting the moving bag blanks passing over roll 170 hold roll 170 and arm 168 down so that the switch button 167 is depressed, solenoid 162 is actuated and the clipper blade is in its upward position (FIGURE 19). As the trailing edge of the moving blank leaves roll 170, arm 168 raises under the spring pressure of switch button 167. This actuates solenoid 161 and lowers clipper blade 144 to sever the plastic sealing tape adjacent to the edge of the blank (FIGURES 20 and 22).

As the leading edge of the next succeeding blank passes over roll 170 arm 168 is again depressed and solenoid 162 is actuated through the micro switch to raise clipper blade 144, again severing the plastic tape adjacent to the edge of the blank and freeing an excess piece of tape 175 from between the blanks (FIGURES 21 and 23). The blanks are then carried to the end of the closing machine and discharged. As shown in FIGURE 24, in which a portion of a closure in a conventional gusseted bag blank is illustrated in section, the severed end 176 of the closing tape is adjacent to but spaced from the edge of the bag so that the seal extends around the side and end edges of the blank as well as through the perforations.

A photo-sensitive cell coacting with a light source may likewise be used as the sensing mechanism for actuating the severing means, as is well known. The severing means is not limited to the reciprocating blade which has been shown as exemplary but may be replaced by any functionally equivalent device among which may be mentioned as examples, rotary knives or a hot wire loop suspended on a metal bar.

DRIVE MEANS

*(FIGURES 1, 2, 3, 6, 7 and 15)*

The conveyor system, punch and cooler rolls are all driven from an electric motor 180 mounted on a bracket 181 supported by vertical channel 51 (FIGURES 1 and 3) which also supports the punch unit. The shaft of motor 180 carries a pulley 182 and by means of belt drive 183 drives pulley 184 keyed to shaft 185. Shaft 185 is carried by bearing blocks 186 supported on channel 51. Shaft 185 also carries pulley 69. The punch unit is driven from pulley 69 by belt drive 68 to fly wheel 67.

The opposite end of shaft 185 is provided with a pulley 187 from which the conveyor system and cooling rolls are driven. A belt drive 188 from pulley 187 drives pulley 190 keyed to a horizontal longitudinal shaft 191. Shaft 191 is carried in bearing 192 supported on a bracket 193 mounted on frame 10. Shaft 191 is adapted to engage and drive a longer horizontal longitudinal shaft 194. An emergency clutch 195 is provided to disengage shafts 191 and 194 in the event of jamming in the machine or like interruption.

Shaft 194 is carried in bearings 196—197—198. The opposite end of shaft 194 is coupled at 199 to the shaft of a standard worm reducer gear box 35 to drive the conveyor system by means of chain drive 34. Gear box 35 and bearing 198 are supported by bracket 200 mounted on frame 10. A roller 201 held in an arm 202 adjustably mounted at the end of frame 10 permits adjustment of tension on chain drive 34.

The drive end of shaft 194 is fitted with a pulley 203 connected by a belt drive 204 to a pulley 205 on the shaft of a reducer gear box 206 mounted on a bracket 207. Gear box 206 is coupled at 208 to a horizontal bevel gear shaft 209 carried in bearings 210—211—212. The bearings are supported by a bevel gear bracket 213 mounted on the outside of side rail 12A of frame 10. Spaced along shaft 209 and corresponding in number to rolls 104—106—108—110 are a plurality of miter gears 214. As best shown in FIGURE 15 the teeth of each miter gear 214 on shaft 209 mesh with the teeth of a miter gear 215 on a horizontal shaft 216 transverse to shaft 209 and carried in bearings 217 mounted on bracket 213.

The opposite ends of shafts 216 are provided with sprockets 218 to drive the cooling rolls by means of chain drive 140. The drives for each set of cooling rolls are identical except for rolls 104—105 which are preferably smaller in diameter. To compensate for the smaller diameters of the rolls 104—105 and their drive sprockets and to insure substantially uniform speed of rotation, the drive sprocket 218A on the first transverse shaft 216 is larger in diameter than the sprockets 218 for the remainder of the rolls. A roll 219 carried by a chain tightener arm 220 permits adjustment of tension on chain drive 140A of the smaller rolls 104—105.

Although the form of apparatus described and illustrated in detail is adapted for the application of a sealing closure on the end of a flat bag blank moving in a horizontal plane, it will be readily apparent that the same sequence of elements may be adapted for the application of a sealing closure on a bag moving horizontally but in a vertical plane, as for example, for closing the end of a filled bag moving past the closure apparatus on a conveyor belt. The same sequence of operations is involved and essentially the same functional units may be utilized to carry them out.

In FIGURE 25 there is shown an exemplary view of a double sided machine adapted to seal both ends of a bag blank simultaneously. The view is taken through the beginning of the cooling roll section of the machine looking toward the discharge end of the machine. The functional units on the left hand side of the machine are mounted on the stationary frame 10. The functional units on the right hand side of the machine are designated by the same numerals with an "A" affixed and are mounted on a movable elongated horizontal beam 230 running the length of the machine and supported on a series of wheeled carriages indicated generally at 231. Chain carrying sprockets 20 and 29 are movable transversely across the machine on shafts 21 and 30, respectively, for adjustment of conveyor chains 15 and 16 to accommodate bag blanks of varying lengths.

Carriages 231 are supported on pulley wheels 232 adapted to run on a track on cross beams 14C of the frame for lateral movement of beam 230 and the functional units mounted on it. Adjustment of the movable beam is by means of pinion 233 journalled in a bracket 234 of one of the carriages 231, the teeth of the pinion gear being adapted to mesh with the teeth of a rack 235 on cross beam 14C. A worm 236 on a shaft 237 is journalled in brackets on the underside of carriage 231 so that the teeth of the worm mesh with the teeth of a worm gear keyed to pinion 233. Rotation of hand wheel 238 and shaft 237 thus causes movement of carriage 231 and beam 230. Only one of the carriages need be provided with means for adjusting the lateral spacing of the movable beam.

Obviously, simultaneous closing of both ends of a bag blank may be accomplished by a machine in which the functional units on both sides of the apparatus are permanently fixed. In this instance only bag blanks of constant length may be closed.

The functional units on both sides of the machine may be independently driven from separate power sources, or, as shown in FIGURE 25, the units on the movable side of the machine may be driven by power taken from the stationary units, as for example, by means of a splined shaft 239 journalled in the frame and driven from bevel gear 214.

It is apparent that many modifications and variations of this invention as hereinbefore set forth may be made without departing from the spirit and scope thereof. The specific embodiments described are given by way of example only and the invention is limited only by the terms of the appended claims.

I claim:

1. Sheet sealing apparatus comprising a frame, upper and lower conveying means mounted on said frame for moving sheet material longitudinally through the apparatus, punch means mounted on one side of said frame in the path of the edges of said sheet material to form a plurality of spaced perforations adjacent the edges of the sheets, an extrusion die mounted on the same side of said frame downstream from said punching means, said extrusion die comprising narrow transverse horizontal slots for forming a narrow ribbon of resinous sealing material on both sides of the perforated edges of the sheets as they move through the apparatus, a plurality of pairs of pressure rolls mounted on the same side of said frame downstream from said extrusion die in the path of the edges of the sheets carrying ribbons of resinous sealing material to force part of the resinous sealing material through the perforations in the edges of the sheets, at least one of the pairs of pressure rolls next following the extrusion die being provided with cooperating peripheral circumferential grooves overlying the perforations in said sheets to provide an excess of resinous sealing material over said perforations.

2. Sheet sealing apparatus according to claim 1 further characterized in that at least some of said pairs of pressure rolls are water cooled.

3. Sheet sealing apparatus according to claim 1 further characterized in that severing means are mounted on one side of said frame downstream from said pressure rolls in the path of the edges of the sheet material, said severing means being operative in response to movement of said sheets through the apparatus to sever the rolled resinous sealing material on the sheet edges and separate the sheets.

4. Bag closure apparatus comprising a frame, upper and lower conveying means mounted on said frame for moving a plurality of flat bag blanks in sequence longitudinally through the apparatus, punch means mounted on one side of said frame in the path of the ends of the bag blanks to form a plurality of spaced perforations adjacent one end edge of the blanks, an extrusion die head mounted on the same side of said frame downstream from said punch means, said extrusion die head comprising an upper and lower narrow transverse horizontal slot having a bulbous vertical extension positioned in the path of the ends of the bag blanks for forming a thin ribbon of resinous sealing material on both sides of the perforated ends of the blanks as they move through the apparatus, a plurality of pairs of pressure rolls mounted on the same side of said frame downstream from said extrusion die in the path of the ends of the bag blanks to force part of the resinous sealing material through the perforations in the ends of the bag blanks, at least some of said pairs of pressure rolls being water cooled, at least the pairs of pressure rolls next following the extrusion die head being provided with cooperating peripheral circumferential grooves overlying the perforations in said bag blanks, at least one of said pairs of pressure rolls being knurled, and severing means mounted on said frame downstream from said pressure rolls in the path of the sealed ends of the bag blanks, said severing means being operative in response to movement of the bag blank through the apparatus to sever the rolled resinous sealing material on the blank ends and separate the bag blanks.

5. Bag closure apparatus according to claim 4 further characterized in that upper and lower horizontal elongated heating elements are disposed longitudinally along the path of the perforated ends of the bag blanks between the punch and die head to preheat the bag blanks before application of the resinous sealing material.

6. Bag closure apparatus according to claim 4 further characterized in that said punch comprises a punch ram vertically movable in a ram slide, a punch on one end of said ram and a die disposed below said punch to cooperate therewith, a connecting rod at the opposite end of said ram connecting said ram with a crank shaft and drive means for rotating said crank shaft.

7. Bag closure apparatus according to claim 4 further characterized in that said severing means comprises an open jawed cliping plate positioned in the path of travel of the ends of the bag blanks, a double-acting, double-edged clpper blade pivotally mounted on said clipper plate whereby the edges of said blade cooperate with the jaws of said plate to sever the sealing material.

8. Bag closure apparatus according to claim 7 further characterized in that said clipper blade is linked to a solenoid controlled pivot arm, switch means for controlling said solenoid and lever arm means in the path of said bag blanks for actuating said switch.

9. Bag closure apparatus according to claim 4 further characterized in that said upper and lower conveying means are provided with a plurality of resilient gripper pads for firmly and securely holding said bag blanks in the course of their travel through the machine.

10. Bag closure apparatus comprising an elongated generally rectangular frame; upper and lower conveying means mounted on said frame for moving a plurality of flat bag blanks in sequence longitudinally through said apparatus, said lower conveying means being longer than the upper conveying means for facilitating entry of the blanks into the apparatus, resilient gripper pads on said conveying means for securely holding said bag blanks; top, bottom and end guide means for said blanks at the inlet end of said apparatus; punch means mounted on one side of said frame in the path of the ends of said bag blanks to form a plurality of perforations adjacent one edge of the blanks, said punch means comprsing a punch ram vertically movable in a ram slide, a punch on one end of said ram and a die disposed below said punch to cooperate therewith, a connecting rod at the opposite end of said ram connecting said ram with a crank shaft; upper and lower horizontal elongated heating elements disposed longitudinally immediately adjacent to said punch means along the path of the perforated ends of the bag blanks; an extrusion die head mounted on the same side of said frame immediately adjacent to said heating elements and positioned in the path of the perforated and preheated ends of the bag blanks for forming a thin ribbon of resinous sealing material on both sides of one end of the bag blanks as they move through the apparatus, said die head comprising an upper and lower transverse horizontal slot having a bulbous vertical extension approximately overlying the perforations in said blanks; a plurality of pairs of pressure rolls mounted on the same side of said frame immediately adjacent to said die head in the path of the ends of the bag blanks to force part of the resinous sealing material through the perforations and around the ends of the blanks, at least some of said rolls being water cooled, at least the pairs of rolls next following the extrusion die head being provided with cooperating peripheral grooves overlying the perforations in said bag blanks, and at least one of said pairs of pressure rolls being knurled, the lower roll of each of said pairs of rolls being rigidly mounted and the upper roll of each of said pairs of rolls being resiliently mounted; severing means mounted on said frame in the path of the sealed ends of the bag blanks adjacent to the last of said pairs of rolls, said severing means comprising an open jawed clipping plate positioned in the path of travel of the ends of said blanks, a double-acting, double-edged clipper blade pivotally mounted on said clipper plate for movement in said jaws whereby the edges of the blade coact with the jaws of said plate to sever the sealing material, said clipper blade being linked to a solenoid controlled pivot arm, switch means for controlling said solenoid, and lever arm means mounted on the frame in the path of said bag blanks and operative in response to the movement of the bag blanks through the apparatus for actuating said switch; and common drive means for operating said punch means, pressure rolls and conveying means.

11. A sealing apparatus comprising a frame; conveying means mounted on said frame for moving a plurality of superimposed sheets longitudinally through said apparatus; rotatable supporting pulleys for said conveyor; drive means for said conveyor; a guide means for said sheets at the inlet end of said apparatus; perforating means mounted at the inlet end of said apparatus in the path of the edges of said superimposed sheets to form a plurality of holes adjacent the edges of said sheets, said perforating means comprising a punch movable in a guide, a die in the path of said punch to cooperate therewith and means to drive said punch; an extrusion die head mounted on said frame between said punch and the outlet end of said apparatus for forming a ribbon of formable resinous sealing material overlapping each side of the perforated edges of said sheets as they move through said apparatus, said die head including two parallel extrusion outlet slots, one such slot on each side of the perforated edges of said sheets; compression means to press said resinous material through the perforations made by said punch, said compression means including a plurality of rolls mounted on said frame in the path of the perforated edges of said sheets, said rolls being located between the die head and the outlet end of said apparatus; cooling means for said resinous material, said cooling means including at least one chamber in intimate relationship with each side of said resinous sealing material and means to pass a cooling medium through each such chamber.

References Cited in the file of this patent

UNITED STATES PATENTS

| | | |
|---|---|---|
| 815,571 | Williams | Mar. 20, 1906 |
| 1,230,151 | Guichard | June 19, 1917 |
| 1,751,451 | Smith | Mar. 18, 1930 |
| 1,956,575 | Hinsky | May 1, 1934 |
| 1,960,997 | Halloran | May 29, 1934 |
| 2,091,125 | Stewart | Aug. 24, 1937 |
| 2,103,945 | Henley | Dec. 28, 1937 |
| 2,140,117 | Salfisberg | Dec. 13, 1938 |
| 2,175,099 | Abbott | Oct. 3, 1939 |
| 2,291,670 | Wiley et al. | Aug. 4, 1942 |
| 2,305,010 | Kenney et al. | Dec. 15, 1942 |
| 2,340,510 | Corley et al. | Feb. 1, 1944 |
| 2,395,077 | Southwick | Feb. 19, 1946 |
| 2,401,551 | Cook | June 4, 1946 |
| 2,454,194 | Maynard | Nov. 16, 1948 |
| 2,467,879 | Billeb | Apr. 19, 1949 |
| 2,597,634 | Grevich | May 30, 1952 |
| 2,624,914 | Rhodes | Jan. 13, 1953 |
| 2,688,581 | Stubbs | Sept. 7, 1954 |
| 2,753,597 | Bird et al. | July 10, 1956 |
| 2,791,807 | Morin | May 14, 1957 |

FOREIGN PATENTS

| | | |
|---|---|---|
| 545,937 | Germany | Mar. 9, 1932 |